United States Patent [19]
Abrams

[11] Patent Number: 5,835,634
[45] Date of Patent: Nov. 10, 1998

[54] BITMAP COMPARISON APPARATUS AND METHOD USING AN OUTLINE MASK AND DIFFERENTLY WEIGHTED BITS

[75] Inventor: Kenneth A. Abrams, Campbell, Calif.

[73] Assignee: Adobe Systems Incorporated, Mountain View, Calif.

[21] Appl. No.: 655,909

[22] Filed: May 31, 1996

[51] Int. Cl.$^6$ .............................. G06K 9/68; G06K 9/74
[52] U.S. Cl. .......................... 382/222; 382/231; 382/219; 382/221
[58] Field of Search ..................................... 382/209, 211, 382/212, 213, 214, 218, 219, 220, 221, 222, 149

[56] References Cited

U.S. PATENT DOCUMENTS

| | | | |
|---|---|---|---|
| 4,481,664 | 11/1984 | Linger et al. | 382/222 |
| 4,587,617 | 5/1986 | Barker et al. | 382/221 |
| 4,618,988 | 10/1986 | Schiller | 382/229 |
| 4,630,308 | 12/1986 | Hongo | 382/222 |
| 4,651,341 | 3/1987 | Nakashima et al. | 382/222 |
| 5,014,330 | 5/1991 | Kobayashi et al. | 382/221 |
| 5,054,090 | 10/1991 | Knight et al. | 382/222 |
| 5,065,440 | 11/1991 | Yoshida et al. | 382/219 |
| 5,101,441 | 3/1992 | Yamaguchi | 382/221 |
| 5,121,444 | 6/1992 | Takizawa et al. | 382/219 |
| 5,163,101 | 11/1992 | Deering | 382/222 |

*Primary Examiner*—Bipin Shalwala
*Attorney, Agent, or Firm*—Fish & Richardson P.C.

[57] ABSTRACT

A bitmap comparison technique that is able quickly to compare two bitmap images while discounting differences between the images likely due to noise. The bitmap comparison technique includes the operations of: comparing the first and second bitmaps, producing a difference map identifying differing bits between the first and second bitmaps, producing outline masks based on the outlines of the first and second bitmaps, identifying certain very different bits within the difference map that are to be weighted differently from the remaining bits within the difference map based upon the outline mask, and determining a comparison score to indicate the extent to which the first and second images differ by differently weighting the very different bits and the remaining bits. The certain bits are normally weighted to a lesser extent than the remaining bits when determining the comparison score so that the influence of noise in the comparison score is diminished. The above bitmap comparison technique can be implemented in numerous ways, including as an apparatus, a method or as a computer-readable medium.

14 Claims, 6 Drawing Sheets

BITMAP COMPARISON APPARATUS AND METHOD USING AN OUTLINE MASK AND DIFFERENTLY WEIGHTED BITS

BACKGROUND

The present invention generally relates to image comparison, and more particularly to a bitmap comparator for comparing bitmaps of images.

In optical character recognition (OCR), a computer identifies or recognizes printed characters in a bitmap representing, for example, a portion or all of a scanned document and obtains their ASCII values. In one approach, the words within the scanned image are identified, the identified words are divided into characters and each character is then identified by the computer running an OCR program or program module. Scanner limitations and noise in the document being scanned make character recognition from a scanned image of printed text difficult.

Characters to be recognized are normally represented as bitmaps obtained from scanning printed text. In the recognition process, a bitmap of an unknown character may be compared to a bitmap of a known character to determine whether they match and if so, how well. One conventional method of comparison aligns the two bitmaps and then forms the Boolean exclusive-OR (XOR) of their corresponding bits to use as a measure of the equivalency or non-equivalency of the two images.

A more recent technique uses a Euclidean distance map. The two bitmaps are aligned and then XORed to form a comparison bitmap. The Euclidean distance map is generated by replacing each black pixel in the comparison bitmap with its distance to the closest white pixel in the comparison bitmap. A value may be computed from this distance map to represent the difference between the two images, which can be compared against a threshold value to determine whether the two images corresponding to the two original bitmaps likely are equivalent.

Although this approach can distinguish meaningful blobs from random noise, it requires the generation of a Euclidean distance map, which is computation-intensive.

Thus, there is a need for a more practical, less computation-intensive image comparison technique to distinguish meaningful differences from those caused by noise.

SUMMARY OF THE INVENTION

Broadly, the invention provides a bitmap comparison technique that is able to compare bitmap images quickly while discounting differences between the images due to noise. The invention can be implemented in numerous ways, including as an apparatus, as a method implemented in a general—or special-purpose computer, or as a program stored on a computer-readable medium.

One aspect of the invention features an apparatus for comparing a first bitmap with a second bitmap, each having an outline mask, that includes: (a) a comparator for comparing the first and the second bitmaps to produce a difference map of the bits which differ between the two bitmaps; (b) a divider for dividing the difference map of bits into multiple pluralities of bits of differing importance using the respective outline masks of the first and second bitmaps; and (c) a comparison score calculator for deriving a score of a match between the two images using the difference map and weighting differently the multiple pluralities of bits of differing importance.

In general, in another aspect, the invention features a method for comparing first and second bitmaps of images, each having an outline mask, that includes the steps of: (a) comparing the first and the second bitmaps to produce a difference map of the bits which differ between the two bitmaps; (b) dividing the difference map of bits into multiple pluralities of bits of differing importance using the respective outline masks of the first and second bitmaps; and (c) deriving a score of a match between the two images using the difference map and weighting differently the multiple pluralities of bits of differing importance. Preferably, the weights of the bits of differing importance are assigned based upon factors such as bitmap size, number of bits, noisiness of the page and ASCII value.

In another aspect, the invention features a computer program, residing on a computer-readable medium, having instructions for causing a computer to: a) compare first and second bitmaps of images, each having an outline mask, to produce a difference map of the bits which differ between the two bitmaps; b) divide the difference map of bits into multiple pluralities of bits of differing importance using the respective outline masks of the first and second bitmaps; and c) derive a score of a match between the two images using the difference map and weighting differently the multiple pluralities of bits of differing importance. Preferably, the bits not falling on the outline masks are weighted to a lesser extent than the remaining bits when determining the score so that the influence of noise is diminished.

Although the invention is generally applicable to comparing bitmaps and generating an indication of their similarities or dissimilarities, the invention is particularly well suited for a character recognition system where character bitmaps are compared and a comparison score is generated and used to determine whether the bitmaps represent the same character.

DETAILED DESCRIPTION OF THE INVENTION

Embodiments of the invention are discussed below with reference to FIGS. 1–6. However, those skilled in the art will readily appreciate that this detailed description is for explanatory purposes only, as the invention extends beyond these limited embodiments.

The embodiments employ various computer-implemented operations involving data stored in data storage and processing elements of computer systems. These operations manipulate electrical signals that are stored, transferred, combined, compared, or otherwise manipulated. These signals are referred to as bits, values, elements, variables, characters or data structures. These and similar terms associated with the appropriate physical quantities are merely convenient labels.

The manipulations performed are often referred to as producing, generating, identifying, determining, dividing, deriving, smearing, inverting or comparing. These operations are computer operations. The present invention also relates to the computer apparatus for performing these operations. The apparatus may be or include a general-purpose computer selectively activated or configured by a computer program stored in the computer, or it may be or include a special-purpose computer so configured. One such exemplary structure is described below.

Figure 1:
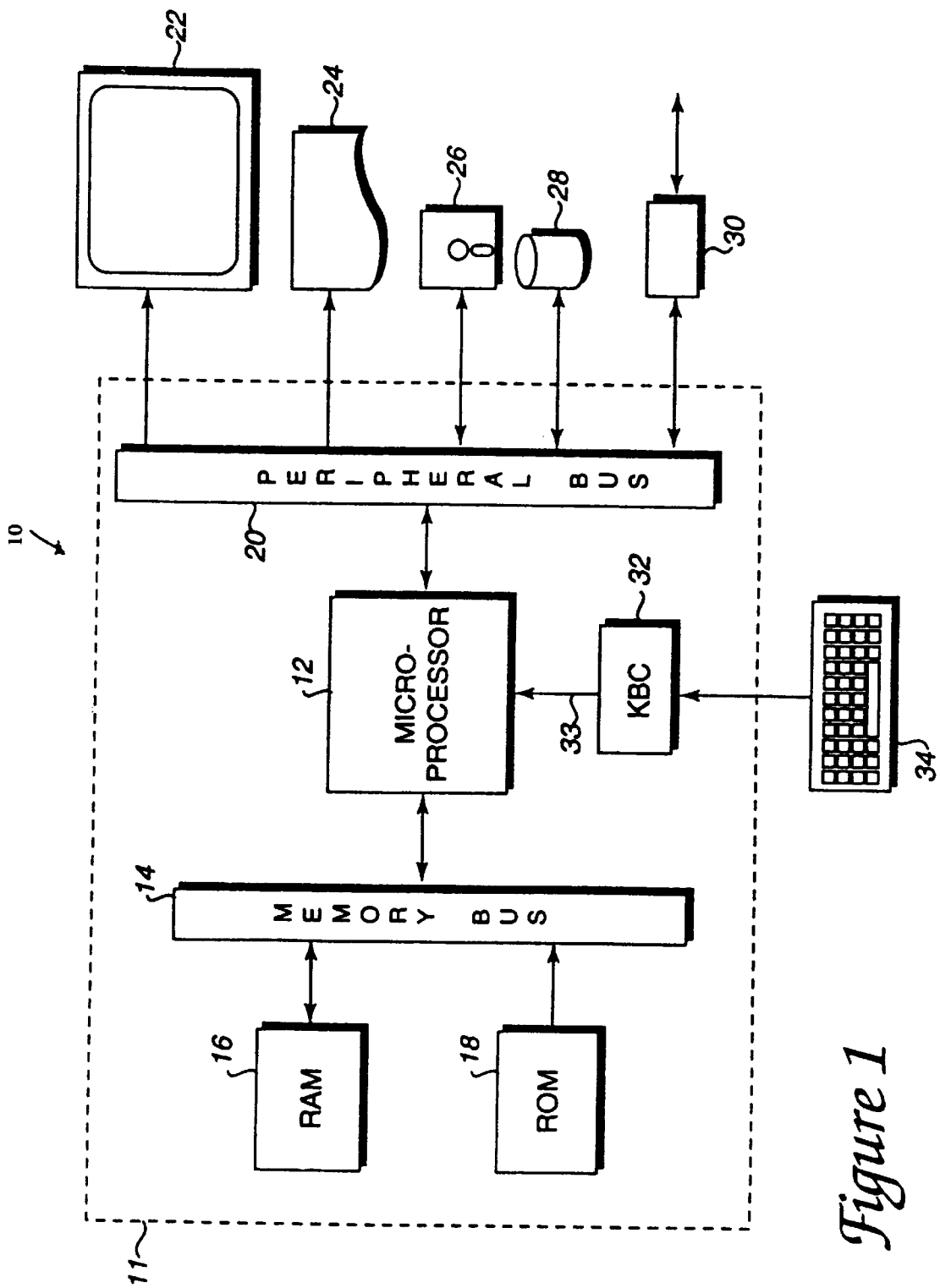
FIG. 1 is a block diagram of an exemplary computer system for comparing bitmaps according to the invention.

FIG. 1 is a block diagram of a computer system 10 programmable for comparing images in accordance with the invention. Computer system includes a digital computer 11, a display screen (or monitor) 22, a printer/scanner 24, a floppy disk drive 26, a hard disk drive 28, a network interface and a keyboard 34. The digital computer 11 includes a processor 12, a memory bus 14, random access memory (RAM) 16, read only memory (ROM) 18, a peripheral bus and a keyboard controller (KBC) 32. Digital computer 11 can be a personal computer (such as an IBM compatible personal computer), a workstation computer (such as a Sun Microsystems or Hewlett-Packard workstation), or other type, size or configuration of computer.

The processor 12 is a general purpose digital processor that controls the operation of the computer system 10. The microprocessor 12 can be a single-chip microprocessor or can be implemented with multiple components. Executing instructions read from memory, the processor 12 controls the reading and manipulation of input data and the output and display of data on output devices. When programmed according to the invention, a particular function of processor 12 is to compare bitmaps of images in a novel way so that meaningful differences are distinguished from differences due to noise.

The memory bus 14 is used by the processor 12 to access the RAM 16 and the ROM 18. The RAM 16 is used by the processor 12 as a general storage area and as scratch-pad memory, and can also be used to store input data and processed data. The ROM 18 can be used to store instructions or program code executed by the processor 12 as well as image descriptions and character outlines used to display images. Alternatively, such image descriptions and character outlines can be included in ROM or RAM within a peripheral device.

The peripheral bus is used to access the input, output and storage devices used by the digital computer 11. These devices may include the display screen 22, the printer/scanner device 24, the floppy disk drive 26, the hard disk drive 28 and the network interface 30. The keyboard controller 32 is used to receive input from keyboard 34 and send decoded symbols for each pressed key to processor 12 over bus 33.

The display screen 22 is an output device that displays images of data provided by the processor 12 via the peripheral bus or provided by other components in the computer system 10. The display screen 22 may be a raster device that displays images on a screen in rows and columns of pixels corresponding, for example, to bits of a bitmap. Raster display screens such as CRT's, LCD displays, and so on are suitable for use as the display screen 22.

The printer/scanner device 24 when operating as a printer may provide an image of a bitmap on a sheet of paper or a similar surface. The printer 24 can be a laser printer, which, like display screen 22, is fundamentally a raster device. Laser printers can be configured to display pixels derived from bitmaps and to print images derived from coded data such as found in a page description language file. The printer/scanner device 24 when operating as a scanner scans documents or similar surfaces to produce bitmaps of the images thereon. Other output devices such as a plotter, typesetter and so on can be used in place of, or in addition to, the printer/scanner device 24.

The floppy disk drive 26 and the hard disk drive 28 can be used to store bitmaps, image descriptions (coded data), and character outlines, as well as other types of data. The floppy disk drive 26 facilitates transporting such data to other computer systems, and hard disk drive 28 permits fast access to large amounts of stored data such as bitmaps, which tend to require large amounts of storage space.

The processor 12, generally under control of an operating system (not shown), executes computer code (instructions) to produce and use data. The computer code and data may reside on the RAM 16, the ROM 18 or the hard disk drive 28. The computer code and data may also reside on a removable program medium and be loaded or installed onto the computer system when needed. Removable program media include, for example, CD-ROM, PC-CARD, floppy disk and magnetic tape.

The network interface is used to send and receive data over a network connected to other computer systems. An interface card or similar device and appropriate computer programs can be used to connect the computer system to a network and transfer data according to standard protocols.

The keyboard 34 is used by a user to input commands and other instructions to programs running on the computer system 10. Images displayed on the display screen 22 or accessible to the computer system can be edited, searched, or otherwise manipulated in response to instructions entered by the user on the keyboard 34. Other types of user input devices can also be used in conjunction with the present invention, including pointing devices such as a computer mouse, a track ball, a stylus or a tablet.

Figure 2:
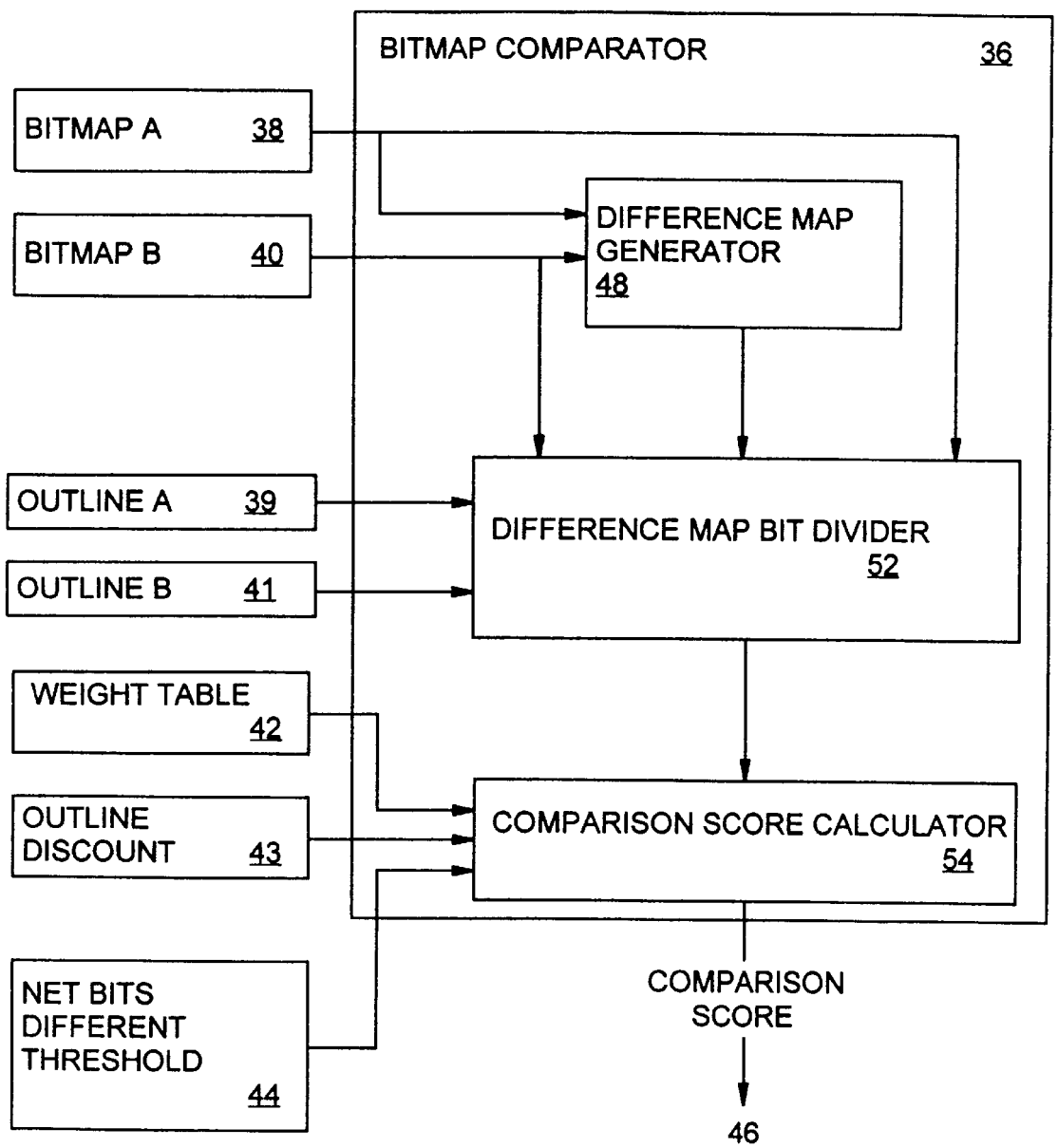
FIG. 2 is a block diagram showing a bitmap comparator of the invention.

FIG. 2 is a block diagram showing a bitmap comparator in accordance with an embodiment of the invention. The bitmap comparator 36 may be implemented by a computer system, such as the computer system illustrated in FIG. 1, programmed in accordance with the methods of the invention.

The bitmap comparator 36 compares two bitmaps A and B (38 and 40), which have been aligned. An input bitmap may be derived from a scanned image of text from which a character recognition system is asked to recognize characters or it may be a stored image of a character. However, a bitmap could, more generally, be of a word or words, symbols, logos, designs or other images. The bitmap comparator 36 operates to identify differences between bitmap A and bitmap B and then to analyze these differences to determine if the two bitmaps match.

When documents are scanned, it is not uncommon for images to shift or to lose or gain one bit (or pixel) in a given direction because of the limitations of the scanner which scans the image. Note that the use of the term "bit" with respect to a bitmap is used, as context requires, to refer to a set bit (usually a '1') that corresponds to a pixel (usually a black pixel) in the rendered image. Consequently, corresponding bits that differ between bitmaps, but are only one pixel from where they should be for a match to occur, are likely caused by noise associated with the scanning process.

Bitmap comparator 36 includes a difference map generator 48 that receives as input bitmap A 38 and also bitmap B 40; the latter bitmap could be a template, for example, in an OCR application. These inputs may be received over busses of the kind shown in FIG. 1, or through programmed process interfaces of code modules running on computer system (FIG. 1). The difference map generator 48 then identifies those bits that are different between the bitmap A and the bitmap B, which will be referred to as the "different bits". Preferably, the difference map generator 48 XOR's corresponding bits of bitmap A and bitmap B, producing a difference map (which may be a bitmap or may be created and used incrementally) containing only the bits that are different between bitmap A and bitmap B.

Figure 5:
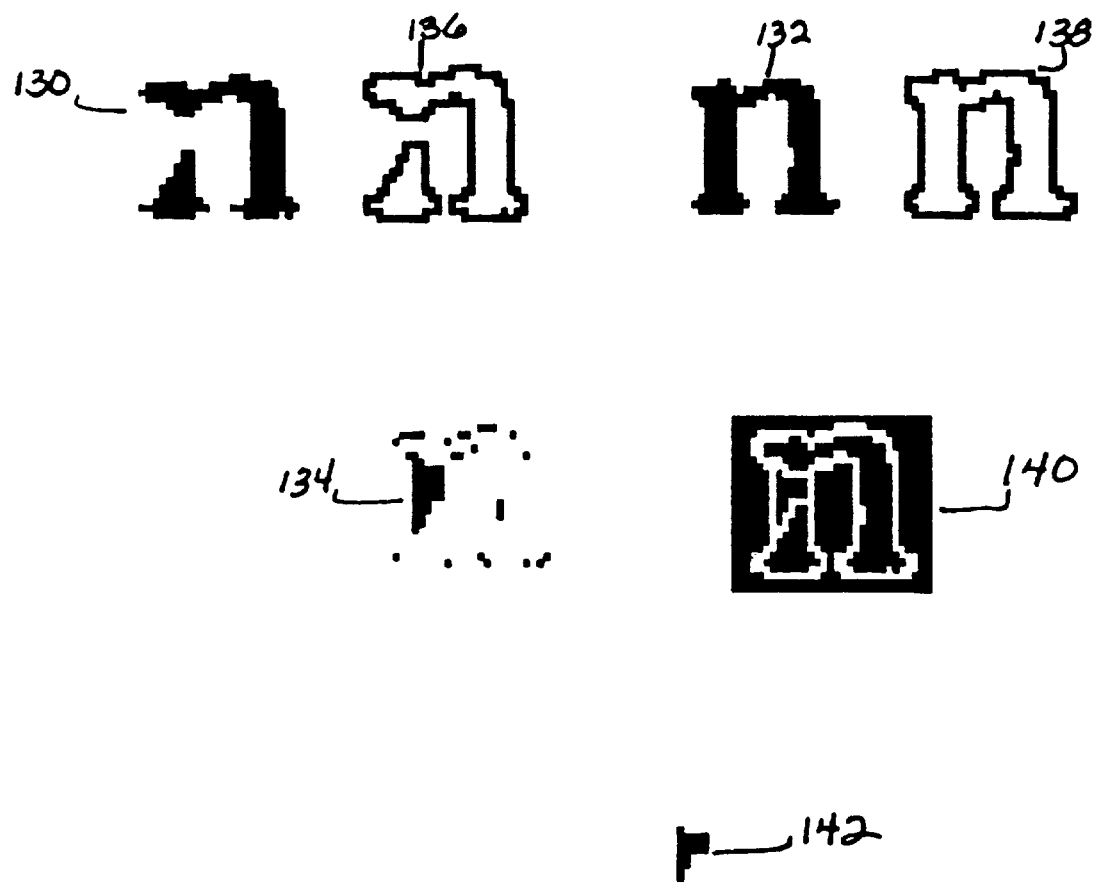
FIG. 5 is an illustration of the use of an embodiment of the method of bitmap comparison.

Difference map bit divider 52 operates to differentiate those bits that differ between bitmap A and the bitmap B by a tolerance of only a single bit from those bits that differ by more. Alternatively, multiple-bit noise tolerances could be used instead of single bit tolerances. In addition to receiving bitmaps A and B, difference map bit divider 52 receives outline A 39 and outline B 41 (each of which is a bitmap) and also receives the difference map from the difference map generator 48. (Outlines are illustrated in FIG. 5, which will be described below.) Using the original two bitmaps, the difference map and the two outlines, the difference map divider 52 counts all the bits that are what will be called "very different" between bitmap A 38 and bitmap B 40. In making this count, divider 52 does not count any of the bits that are common to either outline A 39 or outline B 41. Divider 52 also counts the number of "outline bits", defined as those bits that were not counted as very different bits because they fell on outlines A or B.

Divider 52 also counts all bits "gained". A bit gained is one that is on the bitmap A 39 but not on the bitmap B 40, unless it falls on either of the outlines 39 or 41.

Divider 52 also counts all bits "lost". A bit lost is one that is on the bitmap B 40 but is not on the bitmap A 38. Again, bits lost do not include any bits that fall on either outline A or outline B.

Finally, divider 52 counts the "outline bits gained" and the "outline bits lost". The outline bits gained are bits that are on either of the outlines and are on the bitmap A but are not on the bitmap B. The "outline bits lost" are bits that are on either of the outlines and on the bitmap B, but are not on the bitmap A.

Because of the asymmetry of the definition of bits gained and lost between bitmaps A and B, the former may be referred to as the "input" bitmap and the latter, as the "template" bitmap.

The information calculated by difference map bit divider 52 is passed to comparison score calculator 54. Comparison score calculator 54 determines a score reflecting how closely the input bitmap A matches the template bitmap B. Those bits in the difference map that are likely caused by differences between the images within the bitmaps being compared, but are unlikely to have been caused by scanning noise, were identified as "very different bits" by divider 52. Comparison score calculator 54 then produces a comparison score for the match between the two images represented by the bitmaps A and B using the counts produced by divider 52, weighting differently the counts of the categories of bits of differing importance.

In one embodiment, comparison score calculator 54 calculates a "net bits different". This calculation uses a count of the "outline bits", which are those different bits that fall on either outline A or outline B. The net bits different is obtained by adding the count of very different bits (which does not include any outline bits) to the count of outline bits. Before adding the count of outline bits, the count is multiplied by an outline discount 43, which is provided as an input to the calculator 54. The discount is a factor in the range of zero to one. An outline discount is a weight that determines how much weight to give the outline bits in comparison to the very different bits. The value zero indicates that the outline bits have no importance; the value one indicates that the outline bits are just as important as the very different bits. An outline discount will be determined empirically and may depend on several things, including the character represented by the template being matched. For example, matching against a template for the letter "c", it is very easy for a bitmap of an "e" to lose the cross bar and look like a "c". On the other hand, matching against a template for the capital letter "A", even if an input "A" lost its crossbar, it still generally will be recognizable as an "A". That is not true of an "e". For that reason, the outline discount for an "A" template would generally be smaller than one for an "e" template, other things being equal. Other factors that may also affect the outline discount include the number of bits in the character template map and the height and width (the size in bits) of the character template map.

The comparison score calculator 54 preferably also uses a weight table 42. Like the outline discount, the weight table is also determined empirically and may depend on the character represented by the template being matched ("c" vs. "A", as in the example above), as well as on the number of bits in the character bitmap and the height and width of the character bitmap.

The comparison score calculator 54 uses the weight table 42 to calculate the score based on the net bits different.

| EXAMPLE WEIGHT TABLE | |
| --- | --- |
| Net Bits Different | Comparison Score |
| 2 | 1.00 |
| 5 | 0.90 |
| 20 | 0.40 |

Interpreting the above Example Weight Table, if the net bits different is less than or equal to 2, comparison score calculator 54 returns a comparison score of 1.00, indicating a match success on output 46. If the net bits different is greater than 20, comparison score calculator 54 will return a score of zero (0), indicating a match failure. If the net bits different score is between 2 and 20, calculator 54 performs a linear interpolation from the Example Weight Table to obtain a score between 1.00 and 0.40. For example, if the net bits different is 10, calculator 54 does a linear interpolation between 5 and 20 to obtain a comparison score of 0.73.

Figure 4:
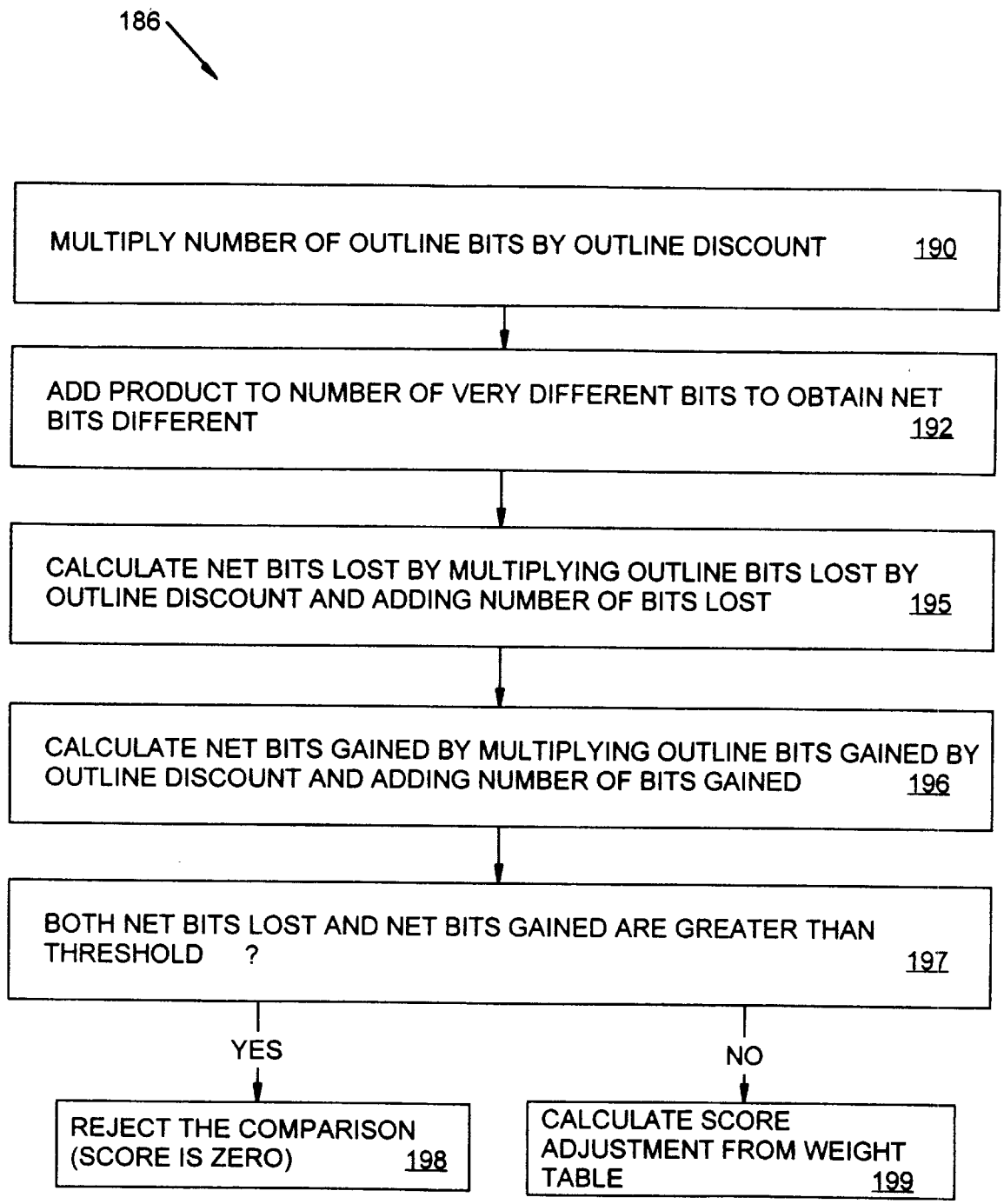
FIG. 4 is a flowchart of a method of comparison score generation.

If the net bits gained and the net bits lost are both above a minimum net bits different threshold 44, the score can be heavily discounted or even rejected entirely (see step 197, FIG. 4). A difficult match showing both black noise and white noise indicates that likely no match exists between the bitmaps. Like the outline discount and the weight table, the minimum net bits different threshold 44 is also determined empirically and may depend on the character represented by the template being matched ("c" vs. "A", as in the example above), as well as on the number of bits in the character bitmap and the height and width of the character bitmap.

Figure 3:
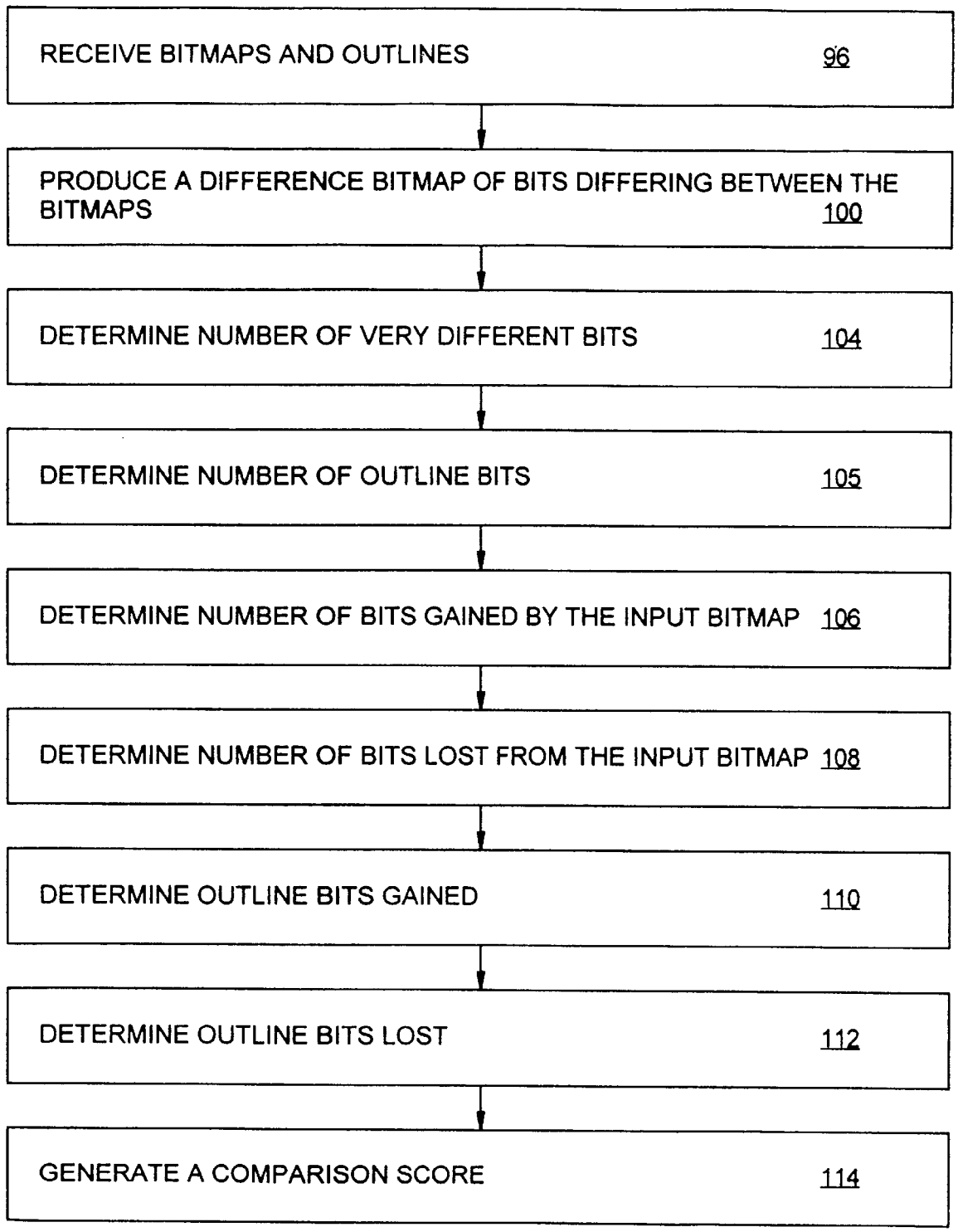
FIG. 3 is a flowchart of a method of bitmap comparison processing.

Referring to FIG. 3, a method for comparing bitmaps 94 receives, at step 96, first and second bitmaps to be compared, along with outlines of the first and second bitmaps. Generally, the first bitmap is an input bitmap of an image to be recognized or compared and the second bitmap is a template bitmap with which the input bitmap is compared. These correspond to the bitmaps and outlines A and B, respectively, of FIG. 2 (38, 40, 39 and 41). The input and template bitmaps are XORed to generate, at step 100, a difference map of bits that differ between the first and second bitmaps.

The total number of very different bits contained in the difference map is determined at step 104. This is done by excluding from the bits of the difference map all bits that fall on either of the outlines received at step 96. The excluded bits are those which have been called "outline bits"; their number is determined at step 105.

The number of bits gained by the input bitmap (bits that are not on the template bitmap but are on the input bitmap) is determined at step 106. The number of bits lost from the input bitmap (from the template bitmap) is determined at step 108. The bits lost or gained do not include any of the outline bits.

Next, the number of outline bits gained by the input bitmap is determined at step from the input bitmap, the template bitmap and the two outlines. These are bits that fell on either outline but were not on the template bitmap. The outline bits lost are determined at step 112. These are bits on the template bitmap that fell on either outline but were not on the input bitmap.

Thereafter, a comparison score is generated at step 114.

Referring to FIG. 4, a method of generating a comparison score 186 multiplies the outline discount by the number of outline bits at step 190. At step 192, the product from step 190 is added to the number of very different bits to obtain the "net bits different".

At step 195, the number of net bits lost is calculated by multiplying the outline bits lost, which are the bits in the template that fall on the template outline but are not on the input bitmap, multiplied by the outline discount. The result is then added to the total number of bits lost determined at step 108 of FIG. 3.

Next, in a similar manner, at step 196, the net bits gained is obtained by multiplying the outline bits gained by the outline discount. The outline bits gained are those bits that are on either of the outlines and are on the input bitmap, but are not on the template bitmap. The result of this multiplication is added to the number of bits gained obtained at step 106 of FIG. 3.

Next, in step 197, a check is made as to whether the net bits lost, calculated at step 195, and the net bits gained, calculated at step 196, are greater than the threshold 44 (FIG. 2). If both the net bits lost and the net bits gained are greater than the threshold, at step 198 the comparison is rejected: the method has concluded there is no match. If neither the net bits lost nor the net bits gained are greater than the threshold, a percentage score adjustment is calculated at step 199 from the weight table 42 (FIG. 2) as has been described. In an alternative embodiment, gained or lost outline bits are weighted differently using different discount factors from gained or lost very different bits.

FIG. 1 is a diagram illustrating an example of a bitmap comparison according to an embodiment of the methods of the invention where a first input bitmap 130 is compared to a second template bitmap 132. Here, the first and second bitmaps 130 and 132 are images of the character "n" that resulted from a scanning operation on a text document. Notice that neither image is perfectly formed and that white noise corrupts the stem portion of the first input bitmap 130.

After the first and second bitmaps 130 and 132 are received at step 96 of FIG. 3, the comparison method 94 produces a difference map of differing bits 134. The number of differing bits is also determined at step 104 of FIG. 3 by counting the bits in the difference map 134. A first outline 136 and a second outline 138 are received at step 96 in FIG. 3. The first outline 136 outlines the first input bitmap 1and the second outline 132 outlines the second template bitmap 132. The first outline 136 is itself a bitmap of those bits that touch a bit in the first input bitmap 130. The second outline 138 is a bitmap of those bits that touch a bit in the second template bitmap 132. The term "bit" with respect to a bitmap refers to a set bit (usually a "1") that corresponds to a pixel (usually a black pixel) in the rendered image. For example, in FIG. 5, the set bits are shown as black pixels in the rendered images, such as image 130. Next, a combined outline mask 140 is produced from the first and second outlines 136 and 138, by Boolean ORing corresponding bits of the first and second outlines 136 and 138 to produce a combined outline, and then inverting the combined outline to produce the combined outline mask 140. Thereafter, a bitmap of very different bits 142 (which were not on either outline 136 or outline 138) is produced by Boolean ANDing the difference map of differing bits 134 and the combined outline mask 140. The total number of outline bits within the difference map of differing bits 134 is determined by subtracting the number of bits in the bitmap of very different bits 142 from the total number of differing bits in the difference map of differing bits 134.

Bits gained is calculated by ANDing bitmap 142 with bitmap 1and counting the bits. Bits lost is calculated by subtracting bits gained from the number of very different bits in bitmap 142. Outline bits gained is found by ANDing bitmap 134 with bitmap 136 and counting the bits. Outline bits lost is found by subtracting outline bits gained from the total number of outline bits.

The comparison score formed at step 114 of FIG. 3 discounts those bits within the difference map of differing bits 134 that are likely to have been caused by noise. The resulting comparison score is thus a better indicator of the similarity or dissimilarity of the two images. By using such an improved comparison score, a character recognition system, for example, is better able to determine that the first input image is the same character as the second template image. A character recognition system not using the invention is likely more often to fail to recognize the first input bitmap 1 as representing an "n" or as showing the second template bitmap 132, or to mis-recognize or the first input bitmap 1 as representing another character, or to fail completely to recognize any character at all.

In each of the above embodiments and examples, additional comparison information (besides the total number of differing bits and the number of outline bits or very different bits) can be used to facilitate or enhance comparison evaluation. The number of outline bits gained, the number of outline bits lost, the total number of bits gained and the total number of bits lost can be determined and used to aid in character identification. Some information is directly obtainable from other previously calculated information. For example, the number of outline bits gained could be determined by Boolean ANDing the first input bitmap with the second template outline, and the number of outline bits lost can be similarly determined by Boolean ANDing the second template bitmap with the first outline of the input bitmap. The comparison score can be produced using any or all of the comparison information, including the number of differing bits, the number of very different bits, the number of bits gained or lost by the input bitmap, the number of outline bits gained or lost and the number of outline bits. The comparison score could also be produced using the number of bits in the images themselves as another source of information.

Figure 6:
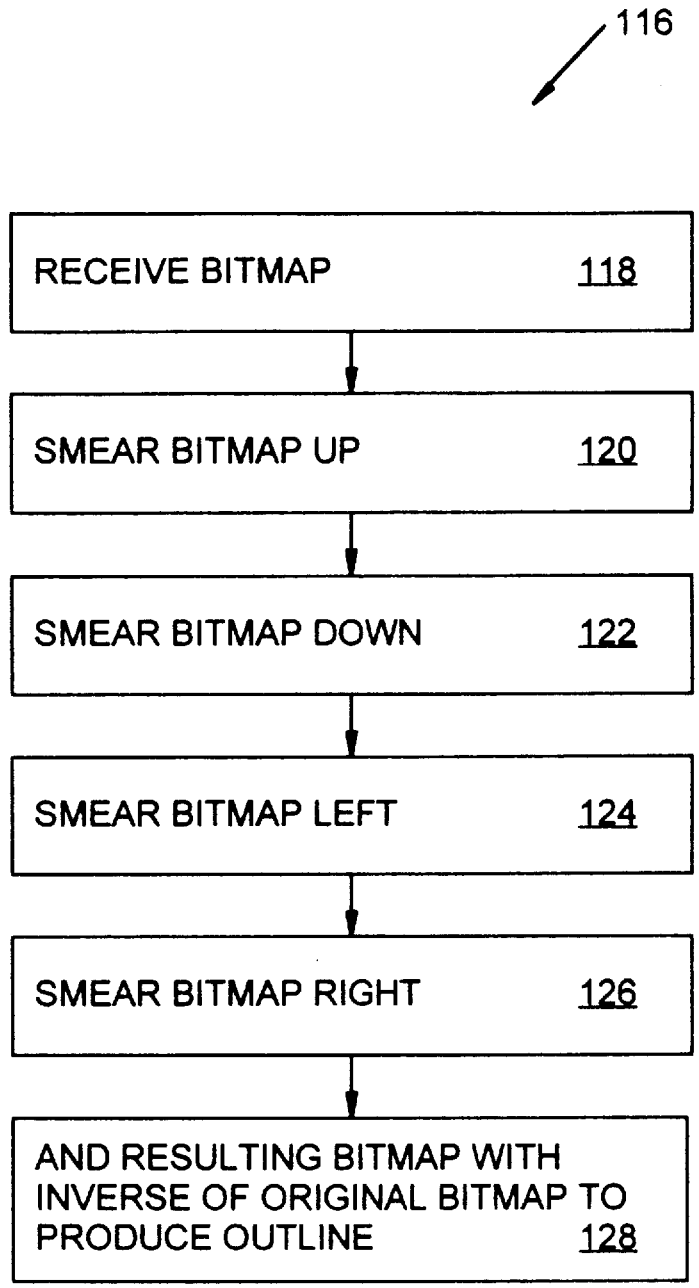
FIG. 6 is a flowchart of a method of bitmap outline processing.

Referring to FIG. 6, the method for creating an outline bitmap 116 begins by receiving the outline prepared at step 118. Next, the bitmap is smeared at step 120. To produce a one bit (or pixel) noise filter, the bitmap is smeared by one bit (pixel), as will be described. The smearing is a Boolean-OR of the original bitmap and a copy of the bitmap moved up one bit. The Boolean-OR may be performed by long operations (e.g., 32 bits) of the processor 12 (FIG. 1), so that many bits are operated on concurrently.

Next, the once-smeared bitmap is smeared down at step 122. This smearing is achieved by a Boolean-OR of a copy of the bitmap received at step 118, moved down one bit, and the once-smeared bitmap.

Next, the twice-smeared bitmap is smeared left at step 124. Then the three-times smeared bitmap is smeared right at step 126. At this point, if it is desired to filter or discount more than one bit or pixel (e.g., two bits or pixels) to discount noise, the steps 118–126 can be repeated using a four-times smeared bitmap as the original. Thereafter, the resulting bitmap from the four-smear operations is Boolean-ANDed to the inverse of the original image bitmap to produce the outline at step 128.

When the processing associated with the invention is performed by an apparatus, such as a general purpose computer that provides long logical operations, the invention is preferably implemented using the long operations so that multiple bits of the bitmaps being processed can be processed simultaneously. When this can be done, it is not necessary that intermediate bitmaps be temporarily stored or even completely formed. It is enough that their bits be processed in accordance with the invention.

The bitmap comparator has been described in terms of particular inputs in the form of outlines and numerical parameters such as discounts, weights and thresholds. The bitmap comparator may be constructed to receive what is substantively the same information but in different forms. A threshold, for example, may be expressed as a percentage of an image or bitmap size rather than as an absolute value without changing the way the comparator operates or the results it achieves.

The many features and advantages of the present invention are apparent from the written description, and thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents should fall within the scope of the invention.

What is claimed is:

1. A method for comparing a first and a second bitmap of an image, each bitmap having an outline mask, comprising:
    (a) comparing the first and the second bitmaps to produce a difference map of the bits which differ between the two bitmaps;
    (b) dividing the difference map of bits into multiple pluralities of bits of differing importance based upon whether they fall on one of the respective outline masks of the first and second bitmaps; and
    (c) deriving a comparison score of a match between the two images using the difference map and weighting differently the multiple pluralities of bits of differing importance.

2. A computer-implemented method for comparing first and second bitmaps of images, comprising:
    (a) obtaining the first and second bitmaps to be compared;
    (b) producing a third bitmap containing any bits which differ between the first and second bitmaps;
    (c) obtaining a respective pair of outline masks based upon the first and second bitmaps;
    (d) identifying certain bits within the third bitmap to be weighted differently from the remaining bits of the third bitmap based upon whether they fall within one of the respective outline masks; and
    (e) determining a comparison score to indicate the extent to which the first and second images differ by differently weighting the certain bits of the third bitmap and the remaining bits.

3. A method as recited in claim 2, wherein the first and second bitmaps each represent a character, and
    wherein the comparison score is used to determine whether the first and second bitmaps are of the same character.

4. A method as recited in claim 2, wherein said identifying step (d) identifies the certain bits of the differing bits that are likely different due to noise.

5. A method as recited in claim 2, wherein the outline mask obtained in step (c) is derived by:
    (c1) smearing the bitmap left, right, up and down by a predetermined number of bits; and
    (c2) producing an outline bitmap by Boolean-ANDing the smeared bitmap with an inverse of its original image.

6. An apparatus for comparing a first bitmap with a second bitmap, each having an outline mask, comprising:
    (a) a comparator for comparing the first and the second bitmaps to produce a difference map of the bits which differ between the two bitmaps;
    (b) a divider for dividing the difference map of differing bits into multiple pluralities of bits of differing importance based upon whether they fall on one of the respective outline masks of the first and second bitmaps; and
    (c) a comparison score calculator for deriving a score of a match between the two images using the difference map and weighting differently the multiple pluralities of bits of differing importance.

7. A computer-implemented method for comparing first and second bitmaps of images, along with their respective outline masks, said method comprising:
    (a) producing a difference map of differing bits between the first and second bitmaps;
    (b) determining a total number of very different bits in the difference map, the very different bits being the ones that are not common to the respective outline masks;
    (c) determining a number of bits lost from the first bitmap;
    (d) determining a number of bits gained by the first bitmap;
    (e) generating a comparison score of a match between the bitmaps based upon the results of one or more of the above steps; and
    (f) determining the likelihood the two bitmaps match based upon the comparison score.

8. The computer-implemented method of claim 7 wherein the comparison score is generated by a procedure including a step of Boolean OR-ing the bits of the outlines of the first and second bitmaps and inverting the result to produce a combined outline.

9. The computer-implemented method of claim 7 wherein the number of bits gained is calculated by Boolean ANDing the very different bits with the first bitmap and counting a resulting number of bits.

10. The computer-implemented method of claim 7 wherein the bits lost is calculated by subtracting the number of bits gained from the number of very different bits.

11. The computer-implemented method of claim 7 wherein the number of bits lost is calculated by Boolean-ANDing the very different bits with the second bitmap.

12. The computer-implemented method of claim 7 comprising the following additional steps:

(g) determining a number of bits gained by the first bitmap which lie on an outline; and (h) determining a number of bits lost from the first bitmap which lie on an outline.

13. The computer-implemented method of claim 12 including the additional step of determining the net bits gained by multiplying the result of step (g) by a discount and adding it to the number of bits gained.

14. The computer-implemented method of claim 12 including the additional step of determining the net bits lost by multiplying the result of step (h) by a discount and adding it to the number of bits lost.

* * * * *